Aug. 9, 1960  B. A. NAGLER  2,948,491
HELICOPTER WITH SHROUDED OR DUCTED ROTOR
Filed July 18, 1956  2 Sheets-Sheet 1
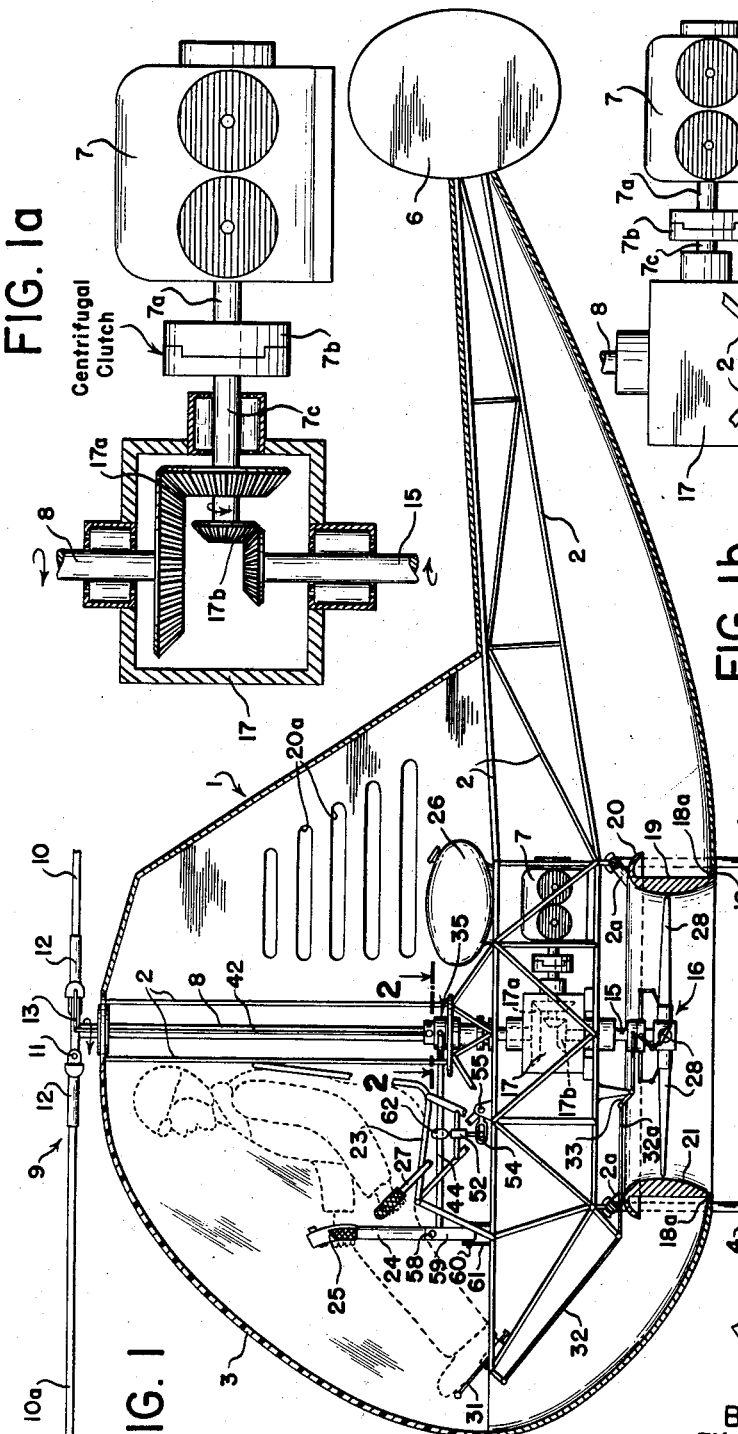
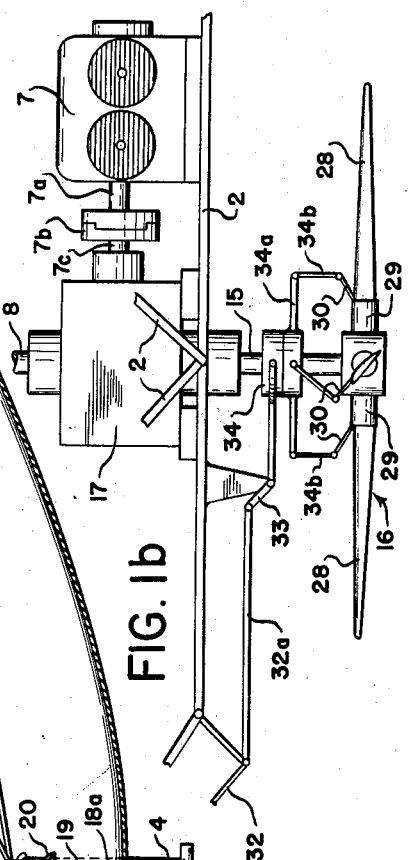
INVENTOR
Bruno A. Nagler
BY
HIS ATTORNEYS

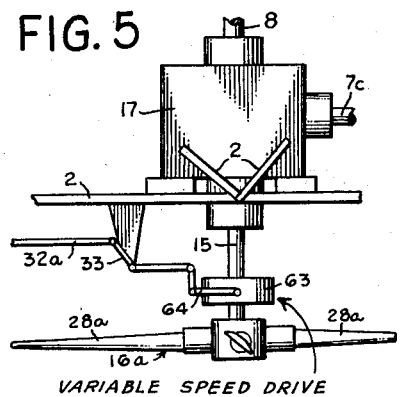
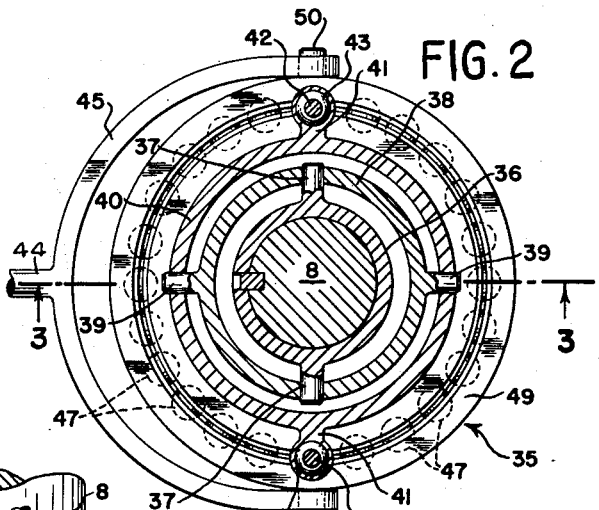
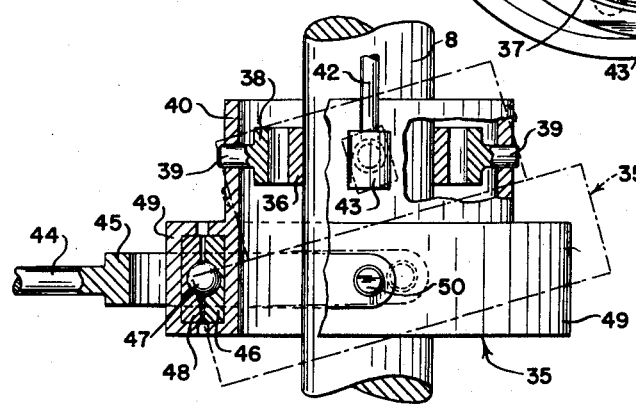
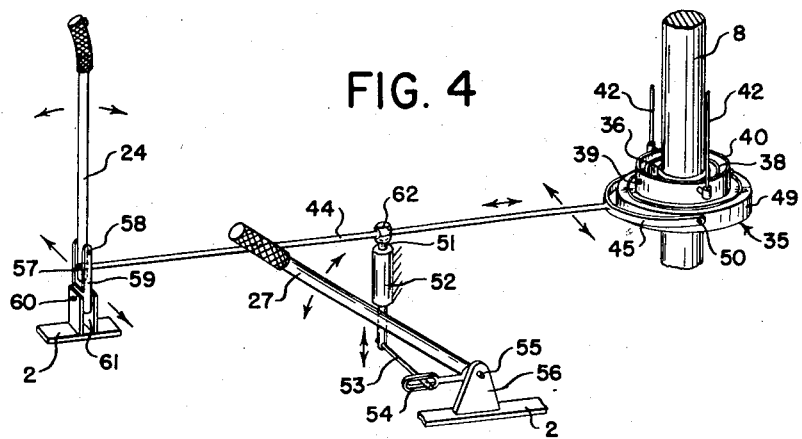

United States Patent Office

2,948,491
Patented Aug. 9, 1960

2,948,491

HELICOPTER WITH SHROUDED OR DUCTED ROTOR

Bruno A. Nagler, Greenwich, Conn., assignor to Nagler Helicopter Co. Inc., White Plains, N.Y., a corporation of Delaware Filed July 18, 1956, Ser. No. 598,560

7 Claims. (Cl. 244—17.21)

This invention relates to aircraft of the rotating wing type and especially to aircraft of this type having counter rotating blades or rotors.

It is well understood that two of the disadvantages of rotary wing aircraft have been, first, the necessity of overcoming the torque of the engine which tends to cause the aircraft to rotate, and secondly, its speed limitations. In the conventional helicopter it is customary to balance the engine torque by means of a laterally directed propeller mounted in the tail portion of the aircraft.

Various attempts have been made to solve the second problem, namely, that of limited air speed. For example, it has been proposed to use Convertaplanes, or small wings attached to the fuselage or the suspension rig of the aircraft, to provide part of the lift and thus allow the machine to attain a higher air speed. Such additional wings have proved objectionable, however, for one reason or another, and the use of the propeller for torque balance is objectionable because it consumes a part of the engine power without providing lift, increases the weight of the aircraft and for other reasons.

When a rotary wing aircraft is in flight the advancing blade of the rotor and the retreating blade behave very differently. The air speed of the advancing blade is equal to the air speed of the aircraft plus the speed due to rotation, whereas the air speed of the retreating blade is equal to the air speed of the ship minus the speed due to rotation. The retreating blade is moving with the wind and, therefore, as the speed of the aircraft increases, the velocity of the blade with respect to the air becomes less and less.

In order to cause this blade to produce its share of the lift, the pitch or angle of attack is increased. Consequently, as the speed of the ship is increased, a point is reached where the rotor blade commences to stall. When an airfoil stalls it loses lift, and this loss of lift, during a portion of the rotation of each of the helicopter blades, produces vibration. Such vibration can become destructive if it is allowed to continue, and thus causes the limitation in forward speed of conventional rotating wing aircraft.

In my prior application, Serial No. 583,510 filed May 8, 1956, there is disclosed an aircraft of the rotating wing type in which higher air speeds are achieved in the following manner: Two rotors are used rotating coaxially in opposite directions about a vertical axis one located above and the other below or within the aircraft structure. The lower rotor is of smaller diameter than the upper and is surrounded by an air duct structure or shroud. Advantageously, the pitch of the blades of the lower rotor is fixed, whereas the upper rotor is provided with means for controlling both cyclic and collective pitch so as to control in a conventional way the direction of travel and the lift. The provision of the lower rotor relieves the upper rotor of a portion of the total lift, and the addition of the shroud or air duct increases the lift of the lower rotor so that as much as two-thirds of the total lift is produced by the lower rotor.

In my former application the engine for operating the two rotors is so mounted that the engine housing, that is, the engine cylinders, crank case, etc., rotates in one direction while the engine crank shaft rotates in the opposite direction. The upper, larger and slower speed rotor is driven by the rotating engine housing, whereas the lower and higher speed rotor is driven by the engine crank shaft. The torques of the two rotors are completely balanced and the aircraft structure is entirely free of any tendency to yaw from such cause.

This eliminates the necessity for the conventional tail propeller whose thrust is directed laterally to control the yaw of the conventional rotary wing aircraft. Thus, the entire power of the aircraft engine is available to provide lift and forward movement, and the derivation of the major portion of the lift by means of the lower rotor enables the upper rotor blades to be operated at a lower angle of attack so that the aircraft can be driven at a considerably higher air speed than conventional aircraft of the rotating wing type without producing stalling and the accompanying vibration.

The aircraft of my present invention is similar to the above except that the engine, instead of having its housing mounted for rotation with respect to the aircraft structure, is mounted in fixed position in the aircraft structure and is operatively connected to the upper and lower rotors by means of gearing which is arranged to drive the two rotors at different rotative speeds so that the torques of the two rotors will approximately or substantially counterbalance one another. It is desirable, however, to employ fixed ratio gearing so that the precise ratio of speed between the upper and lower rotors to produce exact balancing of the torques cannot be achieved under all operating conditions.

Consequently, my persent invention also includes provision for varying the degree of torque balance in one direction or the other so that, if desired, the aircraft can be made to advance without turning in either direction, and, also when desired, for example, in hovering, the aircraft can be turned about its own axis to the right or the left. An advantageous way of accomplishing this is by providing the lower rotor with variable pitch blades and appropriate control means.

It will be understood that, instead of employing a lower rotor of the variable pitch type, a fixed pitch rotor may be used and the rotor torques adjusted to equilibrium by changing the relative speeds of the rotors. For that purpose a gearing may be employed which is constructed to permit speed adjustment. The control of such variable speed mechanism may be manual, or by the feet of the operator, or automatic. Such automatic mechanism may be responsive to changes in the torques of the two rotors and automatically regulate the variable ratio gearing or transmission mechanism so as to maintain substantial balance or equality of the two torques under all conditions.

Although some of the advantages of the invention can be obtained with the duct section or shroud exposed, that is, open to the outside air, in order to obtain the full advantages of the invention, the duct should be within the fuselage and the air supply should be so arranged that the air will flow axially into the duct and to the lower rotor. When the duct, or shroud, is exposed considerable eddying is produced, at the customary tilt angle of the aircraft, at both the leading and trailing edges of the duct inlet. Such eddies both cause noise and create drag, and are generally undesirable. However, by drawing in the air for the duct through openings in the sides of the fuselage, the air can be fed axially and quietly to the duct inlet, the interior of the fuselage becoming a plenum, or tranquilizing chamber.

The invention will be further understood from the following description in connection with the accompanying drawings.

In these drawings:

Fig. 1 is a view in central vertical section through the aircraft;

Fig. 1a is an enlarged diagrammatic view of the engine and gear box;

Fig. 1b is an enlarged fragmentary diagrammatic view showing the control of the collective pitch of the lower propeller blades.

Figs. 2, 3 and 4 are views showing the details of the control mechanism; Fig. 2 being a transverse sectional view taken on line 2—2 of Fig. 1; Fig. 3 a view partly in vertical section taken on line 3—3 of Fig. 2, and Fig. 4 is a diagrammatic perspective.

Fig. 5 is a fragmentary diagrammatic view showing a lower rotor with fixed blades and variable speed transmission.

The aircraft comprises a fuselage or body 1 made, for example, of sheet metal and enclosing the supporting frame structure or suspension rig 2 on all sides. Forward of the pilot's position, the fuselage includes a section 3 of transparent material such, for example, as a suitable plastic. The framework 2 is supported upon four vertical posts 4 at the bottom that terminate in a pair of skids 5 which may, of course, be replaced by wheels, if desired. Frame portion 2 has a rear extension, as shown, at the end of which is mounted a tail fin 6, to aid in directional control, particularly during autorotation.

The aircraft engine is indicated at 7, and a vertical shaft 8, extending upwardly projects above the top of the fuselage 1 and has suitable bearings carried by the air frame 2. A rotor assembly, indicated generally by reference numeral 9, is mounted on the upper end of shaft 8. This rotor assembly comprises at least two blades 10 and 10a of airfoil cross-section. The mounting of these blades is conventional, each blade having a flapping hinge 11 and each blade being longitudinally pivoted to permit feathering.

To this end each blade has a shank 12 which forms the outer member of the longitudinal or feathering pivot. The pitch of each blade can be varied by means of an arm 13 which is fixed to, and preferably formed integrally with, each of the shanks 12, and projects laterally and angularly therefrom so that the inner ends of these two arms are located approximately opposite the center of shaft 8 to facilitate connection with the control mechanism, which will be described later.

The crankshaft 7a of engine 7 (Fig. 1a) is connected through a clutch mechanism indicated diagrammatically at 7b to drive the input shaft 7c of the gearing or transmission mechanism 17 fixed to the airframe 2 and by means of which both the upper and lower rotors are driven. The lower end of the upper rotor shaft 8 projects into the housing of gearing 17 and is connected by means of bevel gearing 17a to the input shaft 7c. In axial alignment with shaft 8 is the lower shaft 15 upon the lower end of which the lower rotor 16 is mounted. The upper end of shaft 15 extends into the housing of transmission 17 and is driven through bevel gearing 17b from the input shaft 7c.

From gearing 17b as diagrammatically shown it will be noted that the lower rotor 16 rotates at the same speed as the engine crankshaft, whereas bevel gearing 17a reduces the speed of shaft 8 so as to drive the upper rotor to a considerably lower speed, as well as in the opposite direction of rotation. It will be understood that the lower rotor may be driven at either a lower or higher rotative speed than the upper, if desired, the important consideration being that the speed ratio of shafts 8 and 15 be such that each rotor shall absorb approximately the same torque. This means that with the usual dimensions of the upper rotor 9, the speed ratio of the lower rotor to the upper will be in the neighborhood of 6:1. Clutch 7b is of the centrifugal type so that the clutch is automatically disengaged when the engine slows down after the throttle is shifted to idling position, and automatically engaged when the throttle is opened and the engine speed increases to a predetermined amount.

Concentric with shafts 8 and 15 the underbody of the fuselage 1 has a circular opening 18 and mounted around the periphery of this opening there is a duct or shroud 19. This member projects upwardly above the lower rotor 16 and is generally of airfoil cross-section and provided with an outwardly turned or spun lip 20 forming the inlet to the duct for the purpose of causing the air within the fuselage to flow axially into the duct. The lower portion of duct 19 is advantageously provided with a Venturi throat 21 to aid the propeller blades in imparting velocity to the air as it flows through the duct and downwardly from the aircraft. The lower edge of shroud 19 is advantageously spaced from the periphery of fuselage opening 18 leaving an annular space 18a so that air flow may take place upwardly and mingle with the air entering the top of the duct. Struts 2a connect duct 19 with the airframe 2 for support.

In order to enable the interior of the fuselage 1 to serve as a plenum chamber and tranquilize the air so it may flow axially into the duct inlet 20, the side walls of the fuselage are provided with openings 20a, preferably in the form of louvers, which are arranged to permit an ample supply of air to be drawn into the interior of the fuselage when the aircraft is in operation.

At the operator's position there is provided a seat 23 and nearby there are the usual control levers. The upright lever 24 provides directional control of the aircraft in forward flight through mechanism which cyclicly feathers the upper rotor blades 10 and 10a. The handle 25 of this lever may be rotated to control the throttle of engine 7, which receives its fuel from a fuel tank 26. A lever 27, which is inclined at one side of the operator's position 23, controls the lift or rate of climb through controlling the collective pitch of the upper rotor blades 10 and 10a.

In order to provide for directional control of the aircraft during hovering, and also to control yaw in ordinary forward flight, means are provided for shifting the torque balance or the torque equilibrium of the two rotors. Since these rotors rotate in opposite directions, and since they are driven by a power source which is fixed to the air frame 2, and unless the torques absorbed by the shafts 8 and 15 are in exact balance, a tendency for the aircraft to rotate or turn about the vertical, in one direction or the other will be evidenced. The torque balance shifting means, therefore, will neutralize such tendency so that the aircraft will move straight ahead in forward flight, and by shifting the balance so that either the upper or the lower rotor receives a slightly greater torque from the engine, the aircraft is made to turn in any desired direction.

A simple and advantageous means for shifting or varying the torque balance is afforded by mounting the blades 28 of the lower rotor 16 on a variable pitch propeller hub, such as is shown diagrammatically in Fig. 1b. It will be understood that this rotor has four blades of airfoil section and that the shanks of these blades are pivoted in the respective hub members 29 in a conventional manner; also that the pitch of each blade can be varied by means of an arm 30 which projects laterally and angularly from the blade shank. The collective pitch of these blades is controlled or varied by means of a foot lever 31 which is pivotally mounted on the air frame 2 and connected through links 32 and 32a to a bellcrank lever 33 also pivoted on a bracket which is mounted on the air frame structure 2. The horizontal arm of this lever 33 is forked and pivoted to the sides of a ball thrust bearing 34. The lower half of this bearing is connected through radial arms 34a and links 34b to the control arms 30.

Thus by shifting foot lever 31, the collective pitch of the blades 28 can be varied and this will result in the rotor requiring greater or less torque from the motor 7. Thus the torque of this rotor can be kept balanced with the torque of the upper rotor, or it can be increased or decreased relative to the torque of the upper rotor, and hence keep the aircraft pointed in a given direction, or cause it to turn to the right hand or to the left.

Another means for shifting the torque balance between the upper and lower rotors is to use a lower rotor which has fixed pitch blades, and a variable ratio transmission between engine 7 and the rotor shafts 8 and 15, previously referred to. This arrangement is illustrated in Fig. 5 where the blades of the lower rotor 16a are fixed and a variable speed gear box 63 of suitable construction is interposed in shaft 15 between gear box 17 and the hub of propeller 16a.

By such means the speed of the lower rotor may be increased or decreased slightly with respect to the rotative speed of the upper rotor, by manipulating the control lever 64 of gear box 63, thereby increasing or decreasing the torque absorbed by the lower rotor and producing the same results above mentioned, namely, to keep the aircraft pointed in a given direction, or to cause it to turn left or right, as may be necessary or desirable during hovering.

The cyclic pitch and collective pitch controlling mechanisms for the upper rotor are shown more or less diagrammatically in Fig. 1, and in greater detail in Figs. 2, 3 and 4.

Referring to Figs. 1, 2 and 3, a swash plate structure is indicated generally by numeral 35. This comprises a sleeve 36 which is arranged to slide vertically on shaft 8 and may be connected to rotate therewith by means of a slidable key, as indicated in Fig. 2. Inner gimbal bearings 37 are formed by trunnions which project into diametrically opposite apertures in outer ring 38. Outer ring member 38, in turn, is provided with gimbal bearings 39 at right angles to bearings 37 and formed by trunnions projecting into apertures arranged diametrically opposite one another in a hollow cylindrical member 40.

Cylinder 40 constitutes a swash plate and, accordingly, is appropriately connected with the respective turning arms 13 of the upper rotor blades 10 and 10a, so as to feather these blades cyclically as they rotate.

For this purpose the hollow cylinder 40 is provided with two lateral projections 41 which are diametrically opposite one another and also in axial alignment with the inner gimbal bearings 37. A pair of vertical rods 42 are disposed on opposite sides of the power shaft 8 and connected by means of ball and socket joints 43 with the respective lateral projections 41. The upper ends of rods 42 are connected to the respective arms 13 by similar universal connections.

It will be understood that the collective pitch, that is, the simultaneous change in the pitch of rotor blades 10 and 10a, can be accomplished by moving the swash plate mechanism 35 vertically on shaft 8.

In order to produce the tilting and vertical movements of swash plate mechanism 35, the control mechanism, shown in Figs. 1 and 4, is provided, which includes the cyclic pitch control lever 24 and the collective pitch control lever 27. To operatively connect these two levers with swash plate mechanism 35, a substantially rigid bar 44, having a forked portion 45, at its right end, is used. The hollow cylindrical member 40 extends some distance (several inches) below the plane of the gimbal bearings 37 and 39, and carries at its lower periphery an inner ball race 46 of a ball bearing 47. The outer ball race 48 is mounted in a ring member 49 having projections 50 diametrically opposite one another, and the forked end 45 of bar 44 is pivoted to these projections.

In order that cyclic pitch lever 24 and collective pitch lever 27 may function, they are associated with bar 44 in the following manner: Bar 44 is supported intermediate its ends on the upper end of a vertically movable rod 51, which slides in a stationary guide 52 fixed to the frame 2 of the aircraft. Fixed to and projecting laterally from the lower end of rod 51 is a rod 53 which is engaged by a slotted arm 54 that is fixed to the lower end of collective pitch lever 27. This lever is pivoted at 55 in a suitable bracket 56 which is attached to a part of the aircraft frame 2.

Thus, when lever 27 is moved in either direction, as shown by the arrows in Fig. 4, it will cause a vertical shifting of rod 51 in guide sleeve 52 thereby raising or lowering the forked end 45 of bar 44, and imparting a bodily shifting movement to swash plate mechanism 35 upwardly or downwardly on shaft 8. The left end of bar 44 is connected by means of a universal joint 57 to the lower end of cyclic control lever 24, and during the vertical movement of bar 44 by collective pitch lever 27, this bar pivots about such joint.

The cyclic pitch control lever 24 is pivoted to be swung in two directions, that is to say, it can swing forward and aft, as indicated by the arrows in Fig. 4, about a pivot 58 at the top of an upwardly projecting forked support 59. Lever 24 can also swing laterally in either direction, as indicated by the arrows and, in so doing, the forked support 59 turns about a pivot 60 on a bracket 61, also mounted on the frame 2 of the aircraft.

In order that bar 44 may be moved longitudinally and also be swung sidewise by lever 24, the bar is mounted at the top of the rod 51 by means of a universal connection 62. This connection comprises a ball member which is not clearly visible but which is mounted within a socket fixed to the top or rod 51. Bar 44 passes through an aperture in the ball member with a sliding fit. It will, therefore, be understood that when cyclic pitch control lever 24 is pushed toward the left, for example, its lower end will move toward the right, as viewed in Fig. 4, and this will cause bar 44 to slide in connection 62 and swing or tilt the swash plate mechanism 35 towards the dotted position shown in Fig. 3.

This will produce a cyclic control of the blades 10 and 10a such that the aircraft will tend to move in a forward direction. Should lever 24 be swung sidewise in either direction, it will turn about pivot 60, and bar 44, pivoting on connection 62, and will cause swash plate mechanism 35 to tilt laterally in a direction opposite to the movement of lever 24. Thus by combined movements the mechanism can be tilted in any direction, and full control of the directional movement of the aircraft in any direction is obtained.

In a rotary wing aircraft, if the angle of attack of the rotor blades is more than about 8° and the rotor speed becomes too high, the stalling point will be reached and dangerous vibration may result. A speed somewhat below the point at which this occurs is the maximum speed at which the aircraft should be operated. With the aircraft of the present invention, since about two-thirds of the lift is provided by the shrouded lower, or fixed pitch rotor, very much higher aircraft speeds may be reached without stalling. Moreover, it is not necessary to adjust the pitch of the blades of the upper rotor to an angle of attack greater than about 8°, even at take-off.

I claim:

1. In an aircraft of the rotary wing type, the combination of an upper rotor and a lower rotor arranged to rotate coaxially, said upper rotor having means for controlling the cyclic pitch and the collective pitch of its blades, said lower rotor being of smaller diameter than the upper rotor and having an air duct structure closely surrounding it, an air-tranquilizing chamber arranged to deliver air to said air duct structure above said rotor, an engine mounted in fixed position in said aircraft, gearing interconnecting said engine and said rotors for driving said rotors in opposite directions and arranged to drive said lower rotor at a rotative speed sufficiently higher than that of said upper rotor so that the torques of said rotors approximately balance one another, and means for shifting said torque balance for controlling yaw and for directional control during hovering.

2. An aircraft as set forth in claim 1 wherein the means for shifting said torque balance comprises a variable ratio transmission between the engine and said rotors so as to vary the relative rotative speeds of said rotors.

3. In an aircraft of the rotary wing type, the combination of an upper rotor and a lower rotor arranged to rotate coaxially, said upper rotor having means for controlling the cyclic pitch and the collective pitch of its blades, said lower rotor being of smaller diameter than the upper rotor and having an air duct structure closely surrounding it, an air-tranquilizing chamber arranged to deliver air to said air duct structure above said rotor, an engine mounted in fixed position in said aircraft, gearing interconnecting said engine and said rotors for driving said rotors in opposite directions and arranged to drive said lower rotor at a rotative speed sufficiently higher than that of said upper rotor so that the torques of said rotors approximately balance one another, and means for varying the torque of one rotor with respect to the other for controlling yaw and for directional control during hovering.

4. In an aircraft of the rotary wing type, the combination of an upper rotor and a lower rotor arranged to rotate coaxially, said upper rotor having means for controlling the cyclic pitch and the collective pitch of its blades, said lower rotor being of smaller diameter than the upper rotor and having an air duct structure closely surrounding it, an air-transquilizing chamber arranged to deliver air to said air duct structure above said rotor, an engine mounted in fixed position in said aircraft, gearing interconnecting said engine and said rotors for driving said rotors in opposite directions and arranged to drive said lower rotor at a rotative speed sufficiently higher than that of said upper rotor so that the torques of said rotors approximately balance one another, and means for controlling the collective pitch of the blades of said lower rotor so as to alter the torque balance between the rotors for the purpose of controlling yaw.

5. In an aircraft of the rotary wing type having a fuselage, upper and lower oppositely rotatable coaxial members, said upper member projecting upwardly from the fuselage and said lower member projecting downwardly within the lower part of the fuselage, a rotor assembly comprising at least two blades of airfoil cross-section hingedly mounted upon said upper rotatable member, a rotor having at least two blades of airfoil cross-section mounted upon said lower rotatable member, an air duct structure closely surrounding said rotor, said duct having an air inlet above said rotor and a discharge opening in the lower surface of the fuselage, pitch control means for controlling cyclic and collective pitch of said rotor assembly, an engine mounted in fixed position in said fuselage, gearing interconnecting said engine and said upper and lower rotatable members to drive said rotors in opposite directions and at different rotative speeds so that the torques of the two rotors substantially counterbalance each other, and means for controlling the collective pitch of the blades of said lower rotor so as to alter the torque balance between the rotors for the purpose of controlling yaw.

6. In an aircraft of the rotary wing type having a fuselage enclosed on all sides, upper and lower oppositely rotatable coaxial members, said upper member projecting through the top of the fuselage, an upper rotor comprising at least two blades of airfoil cross-section hingedly mounted upon said projecting upper rotatable member, an air duct structure having an inlet within the fuselage and an air discharge in the lower surface of the fuselage, said lower rotatable member projecting into said duct, a rotor having at least two blades of airfoil cross-section mounted upon said lower rotatable member and surrounded by said duct, air inlet means in the sides of the fuselage to supply outside air to said inlet and lower rotor, means for controlling cyclic and collective pitch of said upper rotor, an engine having its frame mounted in said fuselage, gearing interconnecting said engine and said upper and lower rotatable members to drive said rotors in opposite directions and at different rotative speeds so that the torques of the two rotors substantially counterbalance each other, and means for controlling the collective pitch of the blades of said lower rotor so as to alter the torque balance between the rotors for the purpose of controlling yaw.

7. An aircraft as set forth in claim 6 wherein the air duct structure is mounted so as to leave an annular opening between its lower edge and the fuselage.

References Cited in the file of this patent

UNITED STATES PATENTS

| | | |
|---|---|---|
| 1,055,533 | Highland | Mar. 11, 1913 |
| 2,399,076 | Trice | Apr. 23, 1946 |
| 2,461,435 | Neumann | Feb. 8, 1949 |